(12) United States Patent
Jia et al.

(10) Patent No.: US 11,070,971 B2
(45) Date of Patent: Jul. 20, 2021

(54) SELF OPTIMIZING AGGREGATION FOR 5G OR OTHER NEXT GENERATIONS WIRELESS NETWORK

(71) Applicant: AT&T Intellectual Property I, L.P., Atlanta, GA (US)

(72) Inventors: Yupeng Jia, Austin, TX (US); Yakun Gao, Suwanee, GA (US); Yonghui Tong, Alpharetta, GA (US); Wen Yang, Bellevue, WA (US); Ye Chen, Milton, GA (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 119 days.

(21) Appl. No.: 16/508,017

(22) Filed: Jul. 10, 2019

(65) Prior Publication Data
US 2021/0014671 A1 Jan. 14, 2021

(51) Int. Cl.
*H04W 8/24* (2009.01)
*H04W 72/04* (2009.01)
(Continued)

(52) U.S. Cl.
CPC ............ *H04W 8/24* (2013.01); *H04W 60/00* (2013.01); *H04W 72/0453* (2013.01); *H04W 76/11* (2018.02); *H04W 88/023* (2013.01)

(58) Field of Classification Search
None
See application file for complete search history.

(56) References Cited

U.S. PATENT DOCUMENTS

2007/0224990 A1* 9/2007 Edge .................. H04W 8/24
455/436
2010/0009682 A1* 1/2010 Iwamura ............ H04W 36/06
455/436

(Continued)

FOREIGN PATENT DOCUMENTS

WO WO-2020067987 A1 * 4/2020 ............ H04W 8/24

OTHER PUBLICATIONS

3GPP TS 38.331 5G;NR;Radio Resource Control (RRC); Protocol Specification (3GPPP TS 38.331 version 15.3.0 Release 15), Oct. 2018 (Year: 2018).*

*Primary Examiner* — Ayaz R Sheikh
*Assistant Examiner* — Tarell A Hampton
(74) *Attorney, Agent, or Firm* — Amin, Turocy & Watson, LLP

(57) ABSTRACT

Various embodiments disclosed herein provide for optimization of information required for establishing an initial connection with a network device. According to some embodiments, a system can comprise receiving a service request from a network device. The system can further comprise determining a first size of a network device capabilities message, wherein the determining is based on a second size of the network device capability message previously collected from the network device; and based on a first result of analyzing the first size of the network device capabilities message and a message size threshold, determining that the network device capabilities message is not greater than the message size threshold, and requesting the network device to provide the network device capabilities message associated with network device capabilities in accordance with a single step enquiry.

20 Claims, 11 Drawing Sheets

(51) Int. Cl.
*H04W 76/11* (2018.01)
*H04W 88/02* (2009.01)
*H04W 60/00* (2009.01)

(56) References Cited

U.S. PATENT DOCUMENTS

| | | | |
|---|---|---|---|
| 2014/0204901 A1* | 7/2014 | Hedman | H04W 36/0022 370/331 |
| 2014/0370905 A1* | 12/2014 | Kim | H04W 8/24 455/450 |
| 2015/0264637 A1* | 9/2015 | Zaus | H04W 8/20 455/434 |
| 2018/0262905 A1* | 9/2018 | Dhanapal | H04W 8/24 |
| 2019/0200212 A1* | 6/2019 | Quan | H04W 72/04 |
| 2019/0239064 A1* | 8/2019 | Stojanovski | H04W 36/0022 |
| 2019/0313239 A1* | 10/2019 | Horn | H04W 8/08 |
| 2020/0137744 A1* | 4/2020 | Shikari | H04L 5/0053 |
| 2020/0351762 A1* | 11/2020 | Casati | H04W 60/00 |

* cited by examiner

SELF OPTIMIZING AGGREGATION FOR 5G OR OTHER NEXT GENERATIONS WIRELESS NETWORK

TECHNICAL FIELD

This disclosure relates generally to optimizing connection failures and throughput degradation. More specifically, facilitating optimization of information required for establishing an initial connection with a network device, e.g., for 5th generation (5G) or other next generation wireless network.

BACKGROUND 5G wireless systems represent a next major phase of mobile telecommunications standards beyond the current telecommunications standards of $4^{th}$ generation (4G). In addition to faster peak Internet connection speeds, 5G planning aims at higher capacity than current 4G, allowing a higher number of mobile broadband users per area unit, and allowing consumption of higher or unlimited data quantities. In 5G and other 4G/LTE technologies, for an initial connection with a network node device (e.g., base station, eNodeB, gNodeB and the like) a communication device (e.g., user equipment (UE), mobile device and the like) provides device capability information by transmitting a message (e.g., a radio resource control (RRC) message) to the network node device in response to an enquiry made by the network node device. The message informs the network node device all the UE's capabilities. This exchange allows the e/gNodeB to provide most efficient resources based on UE's capabilities. However, as more features are added to 5G/LTE, the information becomes large and complicated to process, which in some cases cause connection failure.

The above-described background relating to exchange for information between UE and network node device for establishing initial connection, is merely intended to provide a contextual overview of some current issues, and is not intended to be exhaustive (e.g., although problems and solution are directed to next generation networks such as 5G, the solutions can be applied to 4G/LTE technologies). Other contextual information may become further apparent upon review of the following detailed description.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
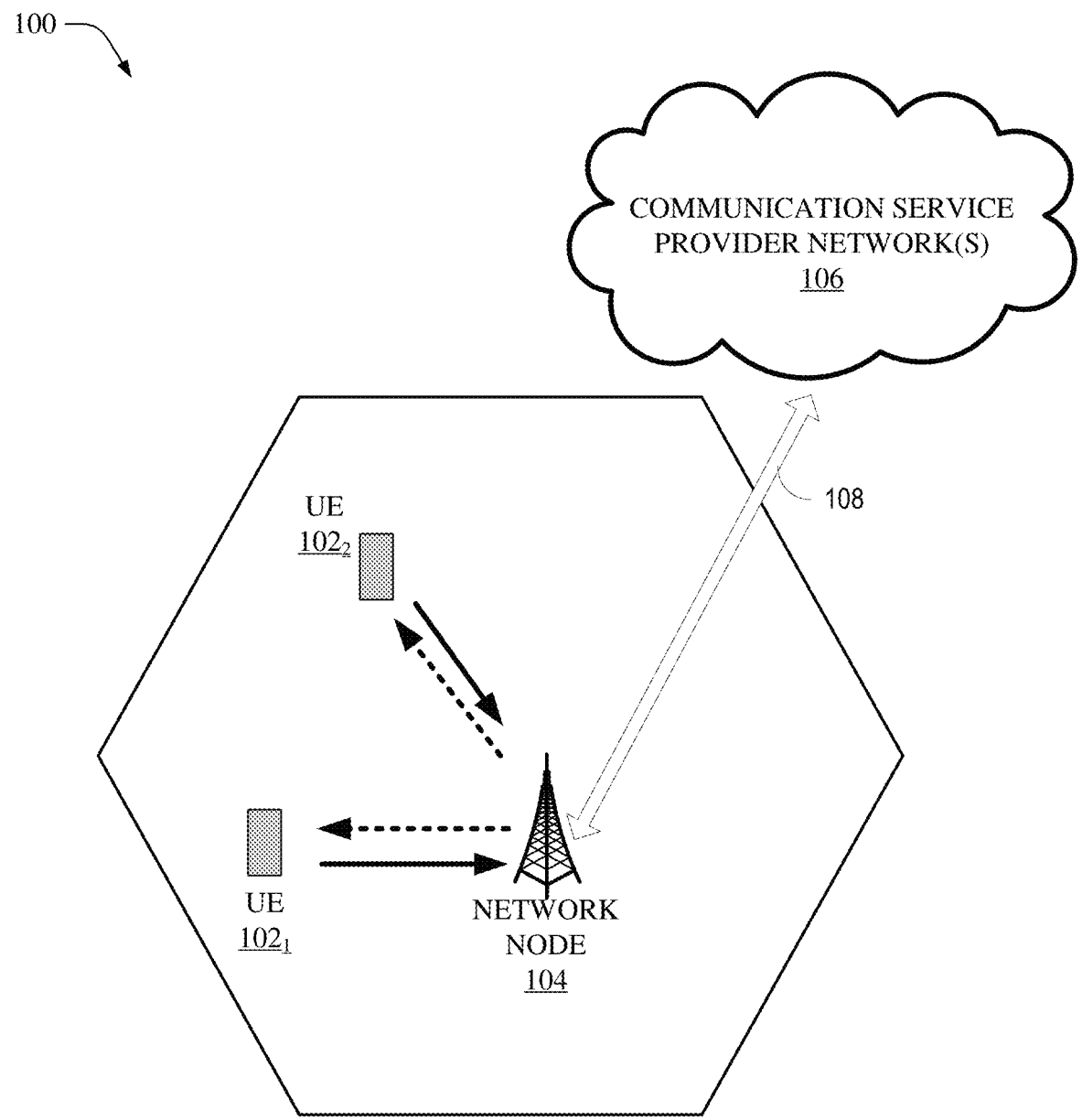
FIG. 1 illustrates an example wireless communication system in which a network node device and user equipment (UE) can implement various aspects and embodiments of the subject disclosure.

In the following description, numerous specific details are set forth to provide a thorough understanding of various embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment," or "an embodiment," means that a particular feature, structure, or characteristic described in connection with the embodiment is included in at least one embodiment. Thus, the appearances of the phrase "in one embodiment," "in one aspect," or "in an embodiment," in various places throughout this specification are not necessarily all referring to the same embodiment. Furthermore, the particular features, structures, or characteristics may be combined in any suitable manner in one or more embodiments.

As utilized herein, terms "component," "system," "interface," and the like are intended to refer to a computer-related entity, hardware, software (e.g., in execution), and/or firmware. For example, a component can be a processor, a process running on a processor, an object, an executable, a program, a storage device, and/or a computer. By way of illustration, an application running on a server and the server can be a component. One or more components can reside within a process, and a component can be localized on one computer and/or distributed between two or more computers.

Further, these components can execute from various machine-readable media having various data structures stored thereon. The components can communicate via local and/or remote processes such as in accordance with a signal having one or more data packets (e.g., data from one component interacting with another component in a local system, distributed system, and/or across a network, e.g., the Internet, a local area network, a wide area network, etc. with other systems via the signal).

As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components. In an aspect, a component can emulate an electronic component via a virtual machine, e.g., within a cloud computing system.

The words "exemplary" and/or "demonstrative" are used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, machine-readable device, computer-readable carrier, computer-readable media, or machine-readable media. For example, computer-readable media can include, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media.

As an overview, various embodiments are described herein to facilitate optimization of information required for establishing an initial connection with a network device. For simplicity of explanation, the methods (or algorithms) are depicted and described as a series of acts. It is to be understood and appreciated that the various embodiments are not limited by the acts illustrated and/or by the order of acts. For example, acts can occur in various orders and/or concurrently, and with other acts not presented or described herein. Furthermore, not all illustrated acts may be required to implement the methods. In addition, the methods could alternatively be represented as a series of interrelated states via a state diagram or events. Additionally, the methods described hereafter are capable of being stored on an article of manufacture (e.g., a machine-readable storage medium) to facilitate transporting and transferring such methodologies to computers. The term article of manufacture, as used herein, is intended to encompass a computer program accessible from any computer-readable device, carrier, or media, including a non-transitory machine-readable storage medium.

It should be noted that although various aspects and embodiments have been described herein in the context of 5G, Universal Mobile Telecommunications System (UMTS), and/or Long-Term Evolution (LTE), or other next generation networks, the disclosed aspects are not limited to 5G, a UMTS implementation, and/or an LTE implementation as the techniques can also be applied in 3G, 4G or other LTE systems. For example, aspects or features of the disclosed embodiments can be exploited in substantially any wireless communication technology. Such wireless communication technologies can include UMTS, Code Division Multiple Access (CDMA), Wi-Fi, Worldwide Interoperability for Microwave Access (WiMAX), General Packet Radio Service (GPRS), Enhanced GPRS, Third Generation Partnership Project (3GPP), LTE, Third Generation Partnership Project 2 (3GPP2) Ultra Mobile Broadband (UMB), High Speed Packet Access (HSPA), Evolved High Speed Packet Access (HSPA+), High-Speed Downlink Packet Access (HSDPA), High-Speed Uplink Packet Access (HSUPA), Zigbee, or another IEEE 802.XX technology. Additionally, substantially all aspects disclosed herein can be exploited in legacy telecommunication technologies.

Described herein are systems, methods, articles of manufacture, and other embodiments or implementations that can facilitate optimization of information required for establishing an initial connection with a network device. Facilitating optimization of information required for establishing an initial connection with a network device can be implemented in connection with any type of device with a connection to the communications network (e.g., a mobile handset, a computer, a handheld device, etc.) any Internet of Things (IoT) device (e.g., toaster, coffee maker, blinds, music players, speakers, etc.), and/or any connected vehicles (cars, airplanes, space rockets, and/or other at least partially automated vehicles (e.g., drones)). In some embodiments the non-limiting term user equipment (UE) is used. It can refer to any type of wireless device that communicates with a radio network node in a cellular or mobile communication system. Examples of UE are target device, device to device (D2D) UE, machine type UE or UE capable of machine to machine (M2M) communication, PDA, Tablet, mobile terminals, smart phone, laptop embedded equipped (LEE), laptop mounted equipment (LME), USB dongles, etc. Note that the terms element, elements and antenna ports can be interchangeably used but carry the same meaning in this disclosure. The embodiments are applicable to single carrier as well as to multicarrier (MC) or carrier aggregation (CA) operation of the UE. The term carrier aggregation (CA) is also called (e.g., interchangeably called) "multi-carrier system", "multi-cell operation", "multi-carrier operation", "multi-carrier" transmission and/or reception.

In some embodiments the non-limiting term radio, network node device, or simply network node is used. It can refer to any type of network node that serves UE is connected to other network nodes or network elements or any radio node from where UE receives a signal. Examples of radio network nodes are Node B, base station (BS), multi-standard radio (MSR) node such as MSR BS, evolved Node B (eNB or eNodeB), next generation Node B (gNB or gNodeB), network controller, radio network controller (RNC), base station controller (BSC), relay, donor node controlling relay, base transceiver station (BTS), access point (AP), transmission points, transmission nodes, remote radio unit (RRU), remote radio head (RRH), nodes in distributed antenna system (DAS), relay device, network node, node device, etc.

Cloud radio access networks (RAN) can enable the implementation of concepts such as software-defined network (SDN) and network function virtualization (NFV) in 5G networks. This disclosure can facilitate a generic channel state information framework design for a 5G network. Certain embodiments of this disclosure can comprise an SDN controller (e.g., controller, central controller, or centralized unit) that can control routing of traffic within the network and between the network and traffic destinations. The SDN controller can be merged with the 5G network architecture to enable service deliveries via open application programming interfaces ("APIs") and move the network core towards an all internet protocol ("IP"), cloud based, and software driven telecommunications network. The SDN controller can work with or take the place of policy and charging rules function ("PCRF") network elements so that policies such as quality of service and traffic management and routing can be synchronized and managed end to end.

In LTE-5G systems, a UE is required to provide both LTE and 5G UE capabilities to the RAN. The 5G UE has larger content in the UE capabilities, for example, but not limited to, Universal Mobile Telecommunications System (UMTS) Terrestrial Radio Access (UTRA), Evolved UTRA (E-UTRA), E-UTRA New Radio (EUTRA-NR), new radio (NR) compared to LTE only UE (e.g., UTRA and/or EUTRA). The RRC is limited by the max supported size of PDCP SDU 8188 octets. The problem may arise when a UE capabilities message is over the maximum limit, thereby causing attachment/connection failures. Also, in order to satisfy the maximum requirement, the UE may generate a reduced size message by not providing all the available capabilities. This can cause lower functionality throughput due to less carrier aggregation (CA) combinations. The 3× Non-Standalone (NSA) NR dual connectivity architecture introduced two more additional UE capabilities category-NR and multi-RAT dual connectivity (MR-DC), each one contain large number of CA combinations, the mmWave spectrum bandwidth is 10 times larger than LTE which introduced countless possibility of contiguous and none contiguous CA combinations based on the different component carriers (50 MHz, 100 MHz, 200 MHz) and BW classes multiply by the number of CA combination on LTE side.

According to some embodiments, described herein a self-optimized approach that facilitates optimization of information required for establishing an initial connection with a network device. For example, the network node device (e.g., base station, eNB, gNB, and the like) can estimate size of the UE capabilities message based on previous exchange with the same UE or another UE having similar capabilities (e.g. first communication or second communication device with similar type allocation code (TAC), wherein the TAC value—The Type Allocation Code (TAC) is the initial eight-digit portion of the 15-dgit IMEI and 16-digit IMEISV codes used to identify wireless device.). Thereafter, the network node device can adjust the list of RAT types under UE capabilities request based on estimated size and priority. In addition, the frequency band list for MR-DC request can be adjusted based on network configuration, wherein both local and neighboring bands can be considered.

In some embodiments, for example, assume that LTE main node and the NR secondary node are only configured for B12, B30, B66, B2, n260 and neighbor sites are configured 2 more bands, B46 and B29. The network node device estimates UE capabilities message size for all 4 RAT types (e.g., UTRA, E-UTRA, E-UTRA-NR, NR) for the requesting UE based on previous 5G and/or LTE only UE capabilities exchange. If the estimated size is smaller than 8K (e.g., a predefined threshold), network node device requests UE capability for all 4 RAT type in one step. Otherwise, the network node device utilizes a two-step UE capability enquiry (e.g., split the E-UTRA/UTRA-legacy and E-UTRA-NR/NR-newer). For each step of the two-step enquiry, if the estimated size is smaller than 8K octets, then request UE to report for both local and neighbor bands. Otherwise, if the estimated size is larger than 8K octets, then request UE to report for only the local configured bands. However, not all the local band are used if the estimated size is above the 8K threshold. In such a case, the report is trimmed based on priority to satisfy the 8K octets limit.

According to an embodiment, a system can comprise a processor and a memory that stores executable instructions that, when executed by the processor, facilitate performance of operations comprising receiving a service request from a network device. The system can further facilitate determining a size of UE capabilities message based on the TAC value of the UE, wherein the determining is based on a second size (e.g., estimated previously) of the network device capability message previously collected from the network device. The system can facilitate, based on a first (e.g., previous) result of analyzing the first size of the network device capabilities message with the same or similar UE type and a message size threshold, determining that the network device capabilities message is not greater than the message size threshold, and requesting the network device to provide the network device capabilities message associated with network device capabilities in accordance with a single step enquiry.

According to another embodiment, described herein is a method that can comprise receiving, by the processor of a device, an attach request (e.g., a request to attach) from a communication device. The method can further comprise determining, by the device, an estimated size of a communication device capabilities message associated with the communication device, wherein the determining is based on analysis of a device capabilities information previously collected from the communication device. The method can further comprise based on a previous result of analyzing the estimated size of the communication device capabilities message and a message size threshold, determining, by the device, that the communication device capabilities message is not greater than the message size threshold, and requesting the communication device to transmit the communication device capabilities message associated with communication device capabilities in accordance with a single step enquiry.

According to yet another embodiment, a device can comprise a processor and a memory that stores executable instructions that, when executed by the processor, facilitate performance of operations comprising receiving an attach request from a first network device. The device can further comprise determining an estimated size of a network device capabilities message associated with the first network device wherein the determining is based on a device capabilities information previously collected from the first network device and a second network device. The device can further comprise based on a first result of analyzing the estimated size of the network device capabilities message and a message size threshold, determining that the network device capabilities message is not greater than the message size threshold, and requesting the network device to transmit the network device capabilities message associated with first network device capabilities in accordance with a single step enquiry.

These and other embodiments or implementations are described in more detail below with reference to the drawings. Repetitive description of like elements employed in the figures and other embodiments described herein is omitted for sake of brevity.

FIG. 1 illustrates a non-limiting example of a wireless communication system 100 in accordance with various aspects and embodiments of the subject disclosure. In one or more embodiments, system 100 can comprise one or more user equipment UEs 102. The non-limiting term user equipment can refer to any type of device that can communicate with a network node in a cellular or mobile communication system. A UE can have one or more antenna panels having vertical and horizontal elements. Examples of a UE comprise a target device, device to device (D2D) UE, machine type UE or UE capable of machine to machine (M2M) communications, personal digital assistant (PDA), tablet, mobile terminals, smart phone, laptop mounted equipment (LME), universal serial bus (USB) dongles enabled for mobile communications, a computer having mobile capabilities, a mobile device such as cellular phone, a laptop having laptop embedded equipment (LEE, such as a mobile broadband adapter), a tablet computer having a mobile broadband adapter, a wearable device, a virtual reality (VR) device, a heads-up display (HUD) device, a smart car, a machine-type communication (MTC) device, and the like. User equipment UE 102 can also comprise IOT devices that communicate wirelessly.

In various embodiments, system 100 is or comprises a wireless communication network serviced by one or more wireless communication network providers. In example embodiments, a UE 102 can be communicatively coupled to the wireless communication network via a network node 104. The network node (e.g., network node device) can communicate with user equipment (UE), thus providing connectivity between the UE and the wider cellular network. The UE 102 can send transmission type recommendation data to the network node 104. The transmission type recommendation data can comprise a recommendation to transmit data via a closed loop MIMO mode and/or a rank-1 precoder mode.

A network node can have a cabinet and other protected enclosures, an antenna mast, and multiple antennas for performing various transmission operations (e.g., MIMO operations). Network nodes can serve several cells, also called sectors, depending on the configuration and type of antenna. In example embodiments, the UE 102 can send and/or receive communication data via a wireless link to the network node 104. The dashed arrow lines from the network node 104 to the UE 102 represent downlink (DL) communications and the solid arrow lines from the UE 102 to the network nodes 104 represents an uplink (UL) communication.

System 100 can further include one or more communication service provider networks 106 that facilitate providing wireless communication services to various UEs, including UE 102, via the network node 104 and/or various additional network devices (not shown) included in the one or more communication service provider networks 106. The one or more communication service provider networks 106 can include various types of disparate networks, including but not limited to: cellular networks, femto networks, picocell networks, microcell networks, internet protocol (IP) networks Wi-Fi service networks, broadband service network, enterprise networks, cloud based networks, millimeter wave networks and the like. For example, in at least one implementation, system 100 can be or include a large scale wireless communication network that spans various geographic areas. According to this implementation, the one or more communication service provider networks 106 can be or include the wireless communication network and/or various additional devices and components of the wireless communication network (e.g., additional network devices and cell, additional UEs, network server devices, etc.). The network node 104 can be connected to the one or more communication service provider networks 106 via one or more backhaul links 108. For example, the one or more backhaul links 108 can comprise wired link components, such as a T1/E1 phone line, a digital subscriber line (DSL) (e.g., either synchronous or asynchronous), an asymmetric DSL (ADSL), an optical fiber backbone, a coaxial cable, and the like. The one or more backhaul links 108 can also include wireless link components, such as but not limited to, line-of-sight (LOS) or non-LOS links which can include terrestrial air-interfaces or deep space links (e.g., satellite communication links for navigation).

Wireless communication system 100 can employ various cellular systems, technologies, and modulation modes to facilitate wireless radio communications between devices (e.g., the UE 102 and the network node 104). While example embodiments might be described for 5G (NR) systems, the embodiments can be applicable to any radio access technology (RAT) or multi-RAT system where the UE operates using multiple carriers e.g. LTE FDD/TDD, GSM/GERAN, CDMA2000 etc.

For example, system 100 can operate in accordance with global system for mobile communications (GSM), universal mobile telecommunications service (UMTS), long term evolution (LTE), LTE frequency division duplexing (LTE FDD, LTE time division duplexing (TDD), high speed packet access (HSPA), code division multiple access (CDMA), wideband CDMA (WCMDA), CDMA2000, time division multiple access (TDMA), frequency division multiple access (FDMA), multi-carrier code division multiple access (MC-CDMA), single-carrier code division multiple access (SC-CDMA), single-carrier FDMA (SC-FDMA), orthogonal frequency division multiplexing (OFDM), discrete Fourier transform spread OFDM (DFT-spread OFDM) single carrier FDMA (SC-FDMA), Filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM CP-OFDM, resource-block-filtered OFDM, Wi Fi, WLAN, WiMax, and the like. However, various features and functionalities of system 100 are particularly described wherein the devices (e.g., the UEs 102 and the network device 104) of system 100 are configured to communicate wireless signals using one or more multi carrier modulation schemes, wherein data symbols can be transmitted simultaneously over multiple frequency subcarriers (e.g., OFDM, CP-OFDM, DFT-spread OFMD, UFMC, FMBC, etc.). The embodiments are applicable to single carrier as well as to multicarrier (MC) or carrier aggregation (CA) operation of the UE. The term carrier aggregation (CA) is also called (e.g. interchangeably called) "multi-carrier system", "multi-cell operation", "multi-carrier operation", "multi-carrier" transmission and/or reception. Note that some embodiments are also applicable for Multi RAB (radio bearers) on some carriers (that is data plus speech is simultaneously scheduled).

In various embodiments, system 100 can be configured to provide and employ 5G wireless networking features and functionalities. 5G wireless communication networks are expected to fulfill the demand of exponentially increasing data traffic and to allow people and machines to enjoy gigabit data rates with virtually zero latency. Compared to 4G, 5G supports more diverse traffic scenarios. For example, in addition to the various types of data communication between conventional UEs (e.g., phones, smartphones, tablets, PCs, televisions, Internet enabled televisions, etc.) supported by 4G networks, 5G networks can be employed to support data communication between smart cars in association with driverless car environments, as well as machine type communications (MTCs). Considering the drastic different communication needs of these different traffic scenarios, the ability to dynamically configure waveform parameters based on traffic scenarios while retaining the benefits of multi carrier modulation schemes (e.g., OFDM and related schemes) can provide a significant contribution to the high speed/capacity and low latency demands of 5G networks. With waveforms that split the bandwidth into several sub-bands, different types of services can be accommodated in different sub-bands with the most suitable waveform and numerology, leading to an improved spectrum utilization for 5G networks.

To meet the demand for data centric applications, features of proposed 5G networks may comprise: increased peak bit rate (e.g., 20 Gbps), larger data volume per unit area (e.g., high system spectral efficiency—for example about 3.5 times that of spectral efficiency of long term evolution (LTE) systems), high capacity that allows more device connectivity both concurrently and instantaneously, lower battery/power consumption (which reduces energy and consumption costs), better connectivity regardless of the geographic region in which a user is located, a larger numbers of devices, lower infrastructural development costs, and higher reliability of the communications. Thus, 5G networks may allow for: data rates of several tens of megabits per second should be supported for tens of thousands of users, 1 gigabit per second to be offered simultaneously to tens of workers on the same office floor, for example; several hundreds of thousands of simultaneous connections to be supported for massive sensor deployments; improved coverage, enhanced signaling efficiency; reduced latency compared to LTE.

The upcoming 5G access network may utilize higher frequencies (e.g., >6 GHz) to aid in increasing capacity. Currently, much of the millimeter wave (mmWave) spectrum, the band of spectrum between 30 GHz and 300 GHz is underutilized. The millimeter waves have shorter wavelengths that range from 10 millimeters to 1 millimeter, and these mmWave signals experience severe path loss, penetration loss, and fading. However, the shorter wavelength at mmWave frequencies also allows more antennas to be packed in the same physical dimension, which allows for large-scale spatial multiplexing and highly directional beamforming.

Performance can be improved if both the transmitter and the receiver are equipped with multiple antennas. Multi-antenna techniques can significantly increase the data rates and reliability of a wireless communication system. The use of multiple input multiple output (MIMO) techniques, which was introduced in the third-generation partnership project (3GPP) and has been in use (including with LTE), is a multi-antenna technique that can improve the spectral efficiency of transmissions, thereby significantly boosting the overall data carrying capacity of wireless systems. The use of multiple-input multiple-output (MIMO) techniques can improve mmWave communications, and has been widely recognized a potentially important component for access networks operating in higher frequencies. MIMO can be used for achieving diversity gain, spatial multiplexing gain and beamforming gain. For these reasons, MIMO systems are an important part of the 3rd and 4th generation wireless systems, and are planned for use in 5G systems.

Figure 2:
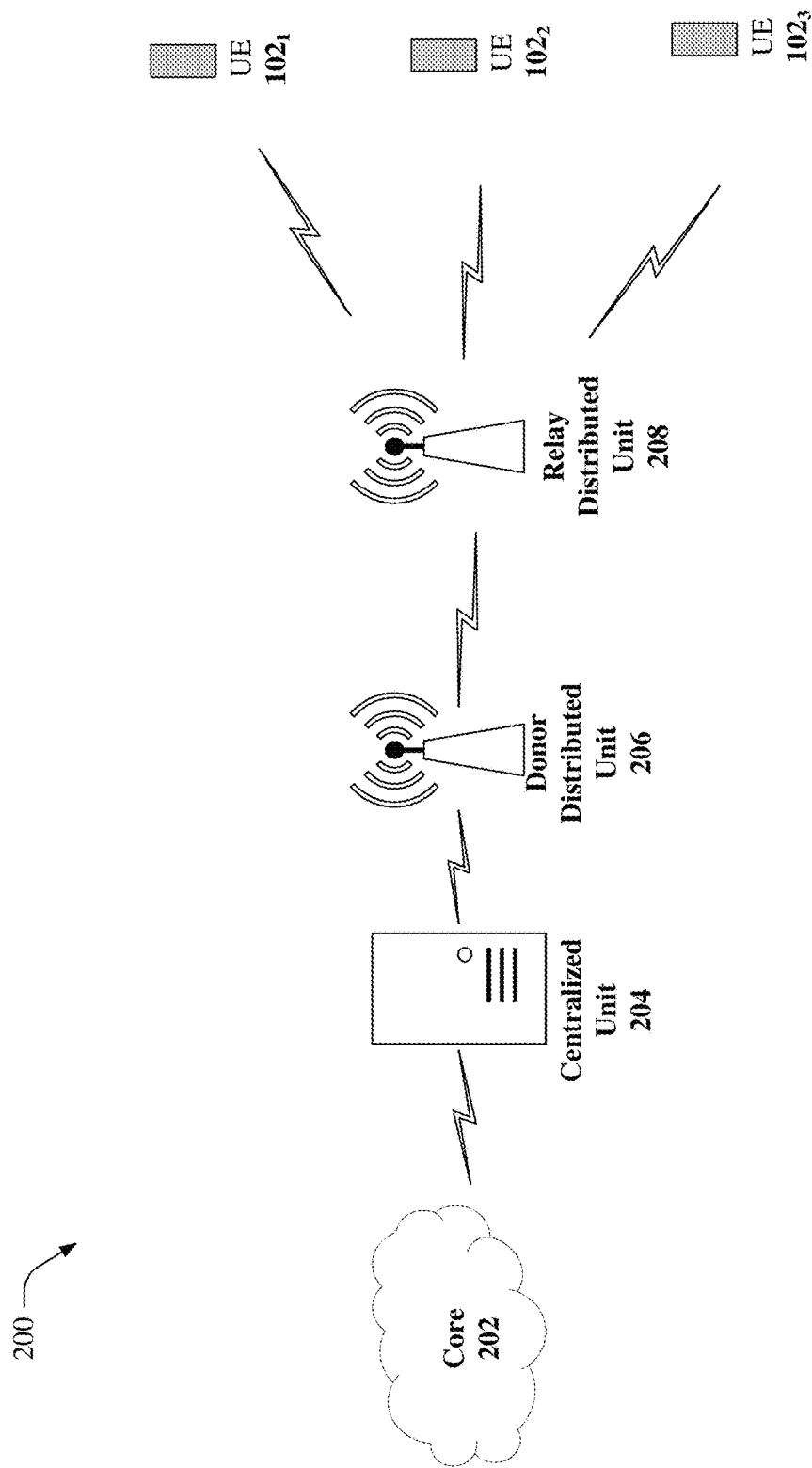
FIG. 2 illustrates an example schematic system block diagram of integrated access and backhaul links according to one or more embodiments.

Referring now to FIG. 2, illustrated is an example schematic system block diagram of integrated access and backhaul links according to one or more embodiments. For example, the network 200, as represented in FIG. 2 with integrated access and backhaul links, can allow a relay node to multiplex access and backhaul links in time, frequency, and/or space (e.g. beam-based operation). Thus, FIG. 2 illustrates a generic IAB set-up comprising a core network 202, a centralized unit 204, a donor distributed unit 206, a relay distributed unit 208, and UEs $102_1$, $102_2$, $102_3$. The donor distributed unit 206 (e.g., access point) can have a wired backhaul with a protocol stack and can relay the user traffic for the UEs $102_1$, $102_2$, $102_3$ across the IAB and backhaul link. Then the relay distributed unit 208 can take the backhaul link and convert it into different strains for the connected UEs $102_1$, $102_2$, $102_3$. Although FIG. 2 depicts a single hop (e.g., over the air), it should be noted that multiple backhaul hops can occur in other embodiments.

The relays can have the same type of distributed unit structure that the gNode B has. For 5G, the protocol stack can be split, where some of the stack is centralized. For example, the PDCP layer and above can be at the centralized unit 204, but in a real time application part of the protocol stack, the radio link control (RLC), the medium access control (MAC), and the physical layer PHY can be co-located with the base station wherein the system can comprise an F1 interface. In order to add relaying, the F1 interface can be wireless so that the same structure of the donor distributed unit 206 can be kept.

Figure 3:
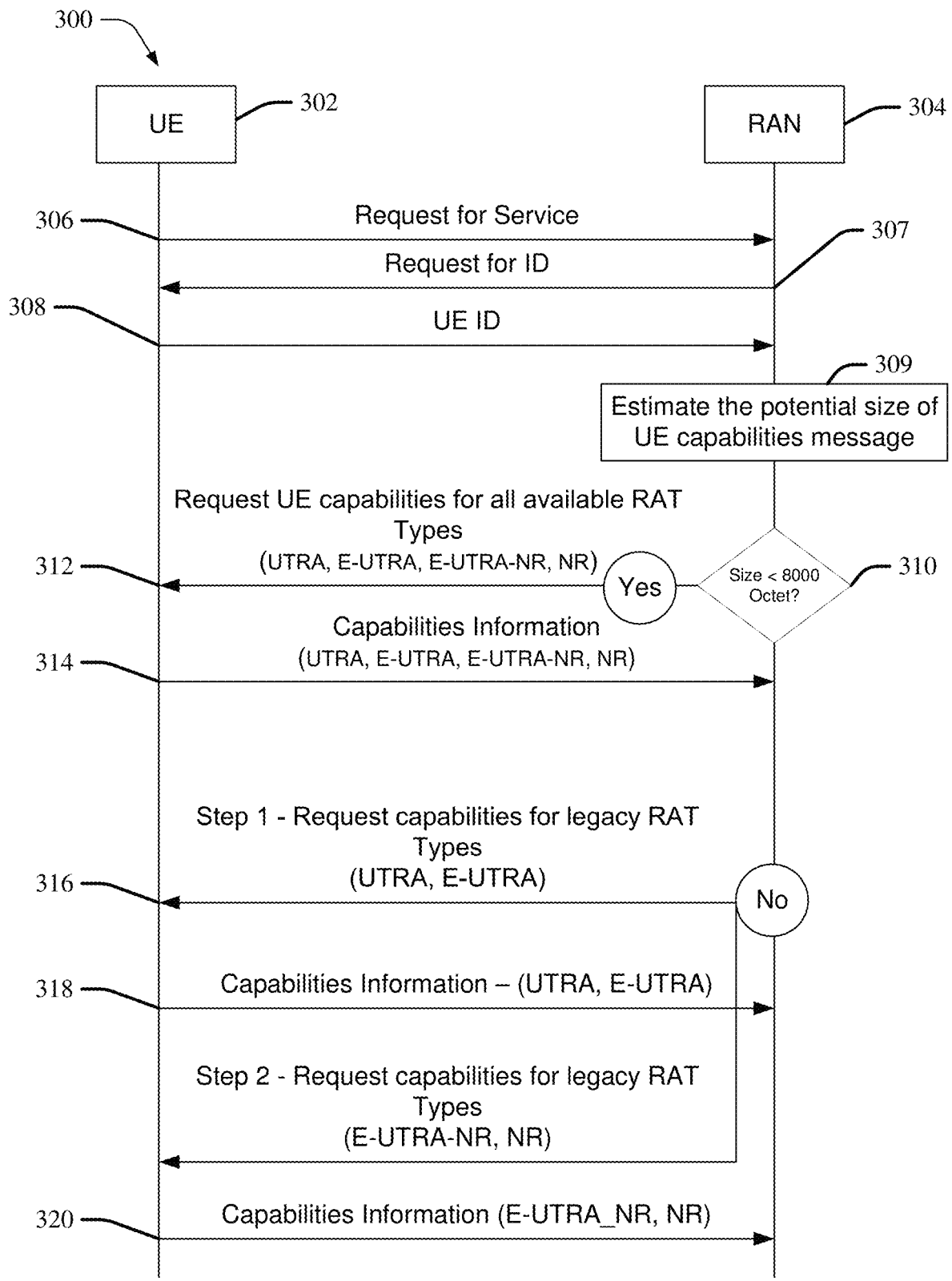
FIG. 3 illustrates is an example exchanges between UE and a network node device in accordance with various aspects and embodiments described herein.

FIG. 3, illustrates an example of message exchanges 300 between UE 302 and a network node device 304 (e.g., RAN—eNB or gNB) in accordance with various aspects and embodiments described herein. In LTE and LTE-5G systems, when a UE 302 is seeking establish a connection with a network node device 304, the UE 302 transmits a request for service message 306. Upon receiving the request for service message 306, the network node device 304 requests for a UE ID to obtain the TAC information from the UE 302 and compare with the previously obtained and stored message size value of the same or similar TAC (same UE type). The UE 302 provides the UE ID in message 308. Upon receiving the UE ID message 308, the network node device determines capabilities of the UE 302 in order to provide the best service. According some embodiments, the eNB 304 estimates size (e.g., potential size or estimated size) of UE capabilities message. The estimate is based on prior exchanges of capabilities information provided by the same UE 302 or another UE (no shown) having similar and/or same capabilities. Upon determining the estimated size, the network node device 304 can analyze the results and determine at 310 whether the estimated size is less than (e.g., or not more than) a predefined message size threshold (e.g., 8000 octets). If determined that estimated size is less than 8000 (e.g., size <8000 octet), then eNB utilizes a single step scheme to request UE 302 capabilities for all available RAT types (UTRA, E-UTRA, E-UTRA-NR, NR). In response, the UE 302, transmits capabilities information message 314 using a single step scheme. If determined that estimated size is more than 8000 (e.g., size >8000 octet), then eNB 304 utilizes a multi-step scheme (e.g., two or more) to request UE capabilities for all available RAT types (UTRA, E-UTRA, E-UTRA-NR, NR). In some embodiments, a single message 316 is transmitted to the UE 304 indicating that UE 304 is required to use two-step enquiry (e.g., using two messages that split the information regarding the RAN Types, one for UTRA and E-UTRA and other for E-UTRA-NR and NR). The first step is for UE to gather capability information for the UTRA and E-UTRA RAN type and transmit the message 318 and the second step is to gather capability information for the E-UTRA-NR NR RAN type and transmit the message 320.

Figure 4:
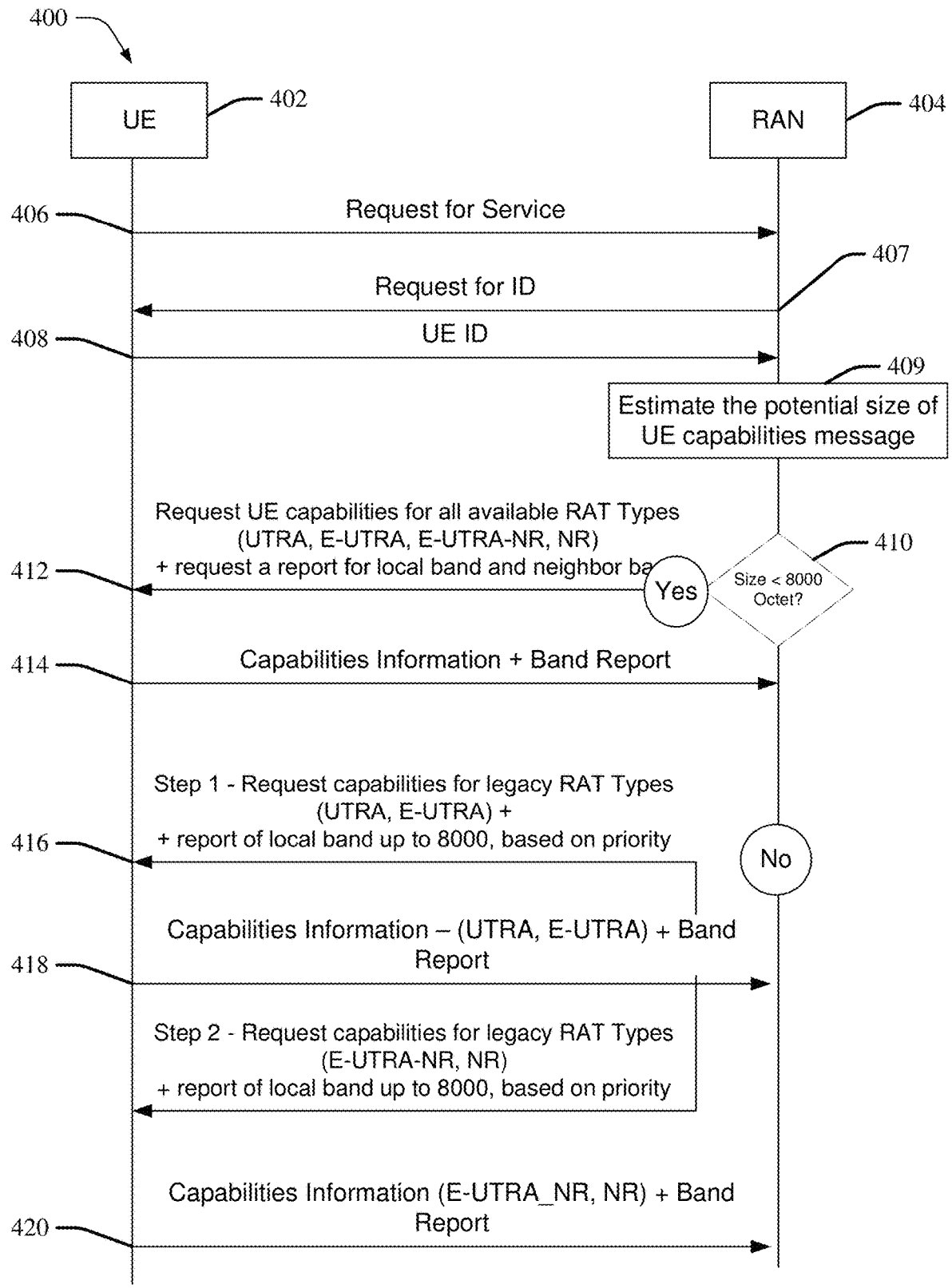
FIG. 4 illustrates is an example exchanges between UE and a network node device in accordance with various aspects and embodiments described herein.

FIG. 4 illustrates an example of message exchanges 400 between UE 402 and a network node device 404 (e.g., gNB) in accordance with various aspects and embodiments described herein. In LTE and LTE-5G systems, when a UE 402 is seeking establish a connection with a gNB 404, the UE 402 transmits a request for service message 406. Upon receiving the request for service message 406, the network node device 404 requests for a UE ID to obtain the TAC information from the UE 402 and compare with the previously obtained and stored message size value of the same or similar TAC (same UE type). The UE 402 provides the UE ID in message 408. Upon receiving the UE ID message 408, the network node device determines capabilities of the UE 402 in order to provide the best service. According some embodiments, the eNB 404 estimates size (e.g., potential size or estimated size) of UE capabilities message. The estimate is based on prior exchanges of capabilities information provided by the same UE 402 or another UE (no shown) having similar and/or same capabilities. Upon determining the estimated size, the gNB 404 can analyze the results and determine at 410 whether the estimated size is less than (e.g., or not more than) a predefined message size threshold (e.g., 8000 octets). If determined that estimated size is less than 8000 (e.g., size <8000 octet), then eNB utilizes a single step enquiry to request UE capabilities for all available RAT types (UTRA, E-UTRA, E-UTRA-NR, NR). In some embodiments, the eNB 404 may request a report for local and neighbor bands. In response, the UE 402, transmits capabilities information message 414 using a single step scheme, that comprise UE capabilities associated with (UTRA, E-UTRA, E-UTRA-NR, NR). In some embodiments, if determined that estimated size is more than 8000 (e.g., size >8000 octet), then eNB 404 utilizes a multi-step enquiry to request UE 402 transmit capabilities message for all available RAT types (UTRA, E-UTRA, E-UTRA-NR, NR). In some embodiments, a message 416 is transmitted to the UE 402 indicating that UE 402 is required to use two-step enquiry (e.g., using two messages that split the information regarding the RAN Types, one for UTRA and E-UTRA and other for E-UTRA-NR and NR). The first step is to gather capability information for the UTRA and E-UTRA RAN type and transmit the message 418 and the second step is to gather capability information for the E-UTRA-NR NR RAN type and transmit message 420. In some embodiments, if determined that estimated size of the UE capabilities message having 2 RAN types, is less than 8000, the gNB 404 request UE 402 to provide a report of local and neighboring band. Otherwise, if determined that estimated size of the UE capabilities message is more than 8000, the gNB 404 requests UE 402 to provide only the local band report up to message size 8000. In some embodiments, the UE 404 can trim the report to meet the 8000-octet size requirement by trimming the report based on priority until 8000 octet requirements is met.

Figure 5:
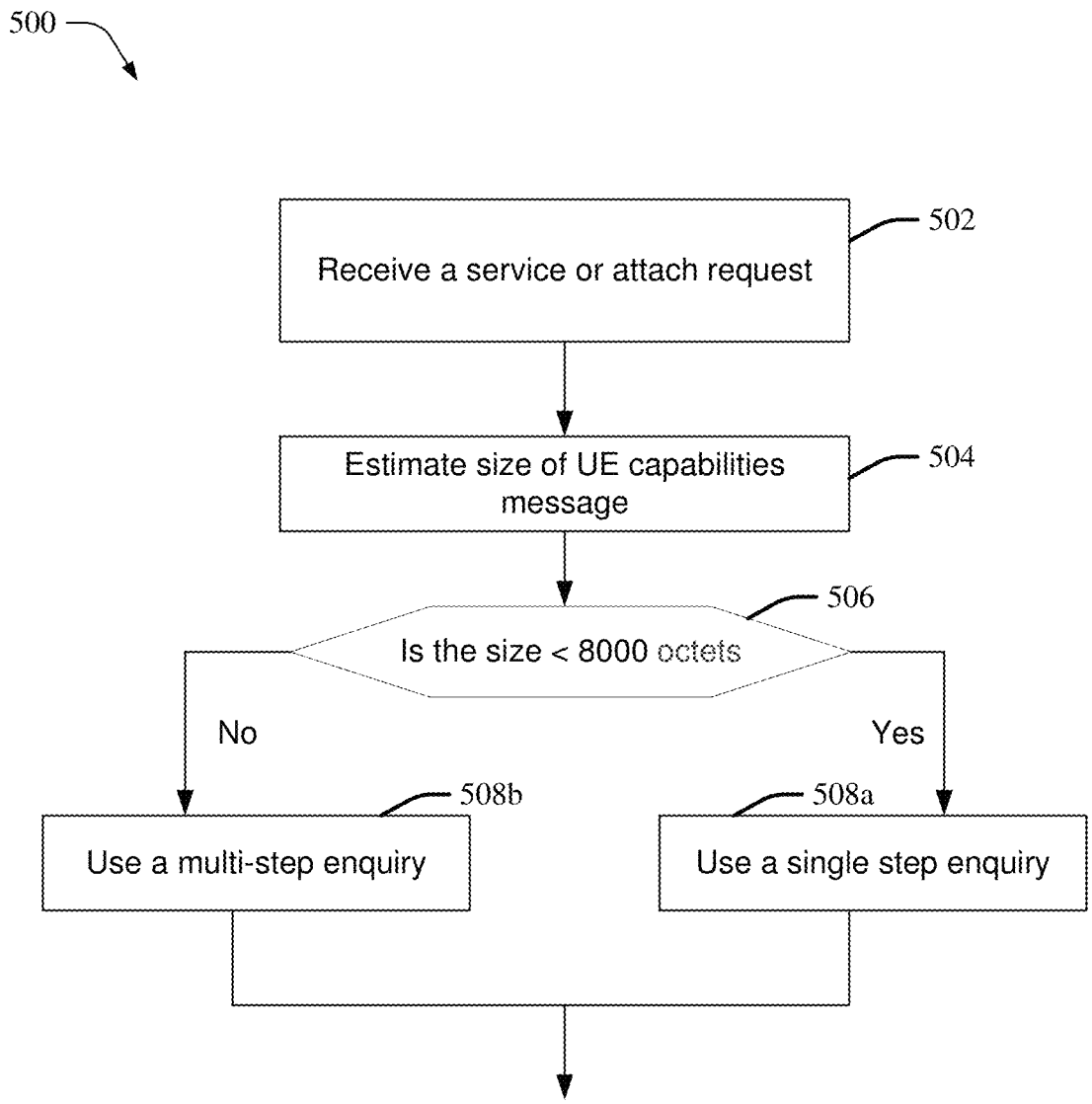
FIG. 5 illustrates a flow diagram of an example, non-limiting system that facilitates optimization of information required for establishing an initial connection with a network device in accordance with one or more embodiments described herein.

FIG. 5 illustrates a flow diagram of an example, non-limiting system 500 that facilitates optimization of information required for establishing an initial connection with a network device in accordance with one or more embodiments described herein. At 502 the system receives a service and/or attach request by the UE (e.g., 302 of FIG. 3) that seeks to obtain resources from a network node (e.g., 304 of FIG. 3). The system, at 504, estimates the size of UE capabilities message based on prior exchanges with the requesting UE or another UE having similar capabilities. The system analyzes the results of the estimation and determines, at 506, if the estimated size of the message is less than a pre-defined threshold (e.g., 8000 octets). If system determines that the estimated size of the message is less than a pre-defined threshold, then the system uses a single enquiry scheme, at 508*a*, to request the UE capabilities report. Otherwise, if the estimated size of the message is more than a pre-defined threshold, then at 508*b*, the system uses a multi-step enquiry scheme to request the UE capabilities report.

Figure 6:
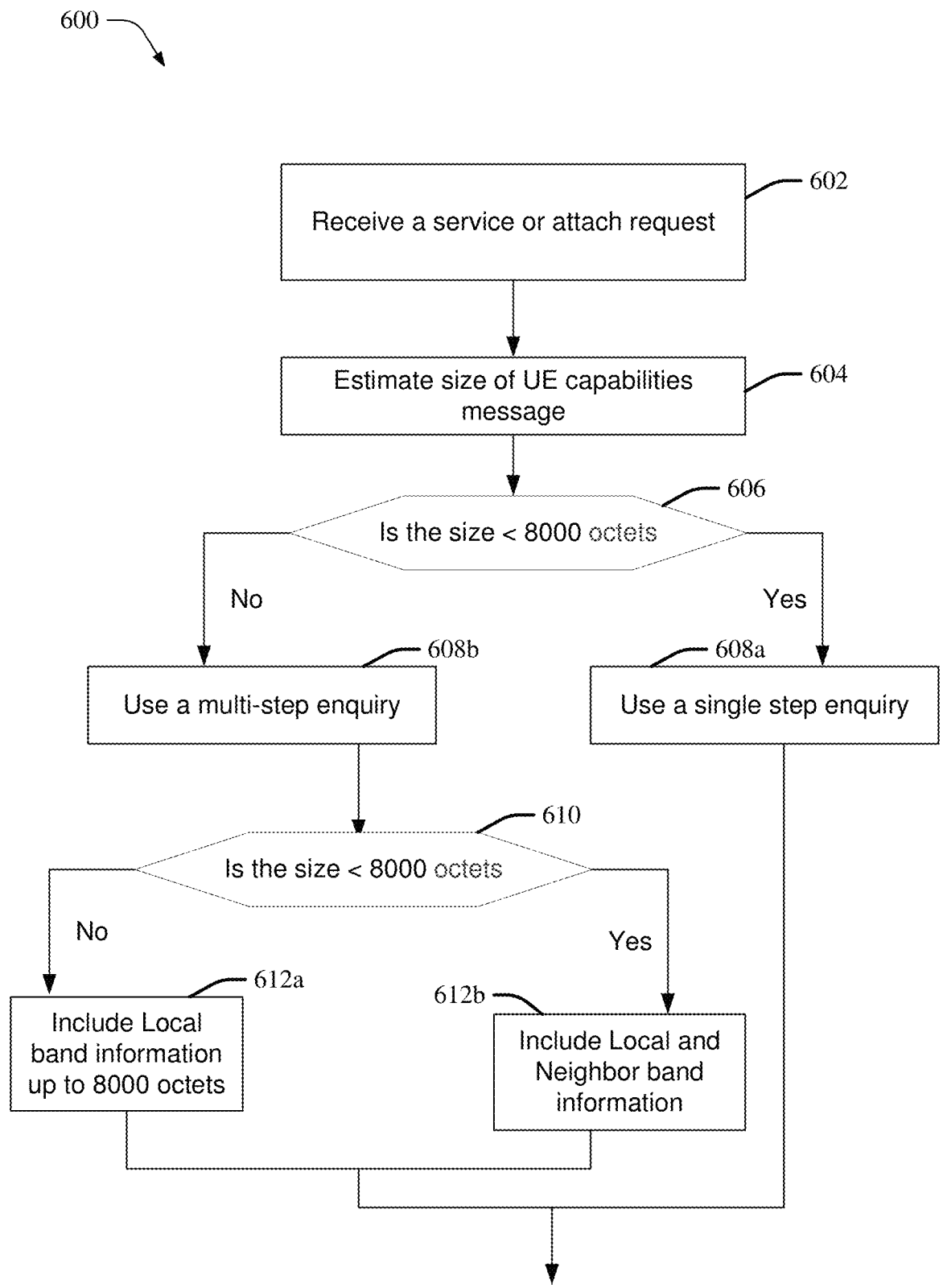
FIG. 6 illustrates a flow diagram of an example, non-limiting system that facilitates optimization of information required for establishing an initial connection with a network device in accordance with one or more embodiments described herein.

FIG. 6 illustrates a flow diagram of an example, non-limiting system 600 that facilitates optimization of information required for establishing an initial connection with a network device in accordance with one or more embodiments described herein. At 602 the system receives a service and/or attach request by the UE (e.g., 302 of FIG. 3) that seeks to obtain resources from a network node (e.g., 304 of FIG. 3). The system, at 604, estimates the size of UE capabilities message based on prior exchanges with the requesting UE or another UE having similar capabilities. The system analyzes the results of the estimation and determines, at 606, if the estimated size of the message is less than a pre-defined threshold (e.g., 8000 octets). If system determines that the estimated size of the message is less than a pre-defined threshold, then the system uses a single enquiry scheme, at 608*a*, to request the UE capabilities report. Otherwise, if the estimated size of the message is more than a pre-defined threshold, then at 608*b*, the system uses a multi-step enquiry scheme to request the UE capabilities report.

In some embodiment, for multi-step enquiry, the UE 302 is requested to split the UE capabilities message into two messages, first message is for UTRA and E-UTRA and second message is for E-UTRA-NR and NR. For each step of the multi-step, the system further estimates the size of the first UE capabilities message and second UE capabilities message. If the system determines, at 610, that the estimated size of the UE capabilities message (e.g., first UE capabilities message and/or second UE capabilities message) is less than 8000 octets, then include both local and neighbor band information in a band report. Otherwise, if the system determines, at 610, that the estimated size of the UE capabilities message is not less than 8000 octets, then include only the local band information only. Furthermore, to reduce the size of messages below 8000 octets, the UE can reduce (e.g., trim) the message by removing local band information based on priority.

Figure 7:
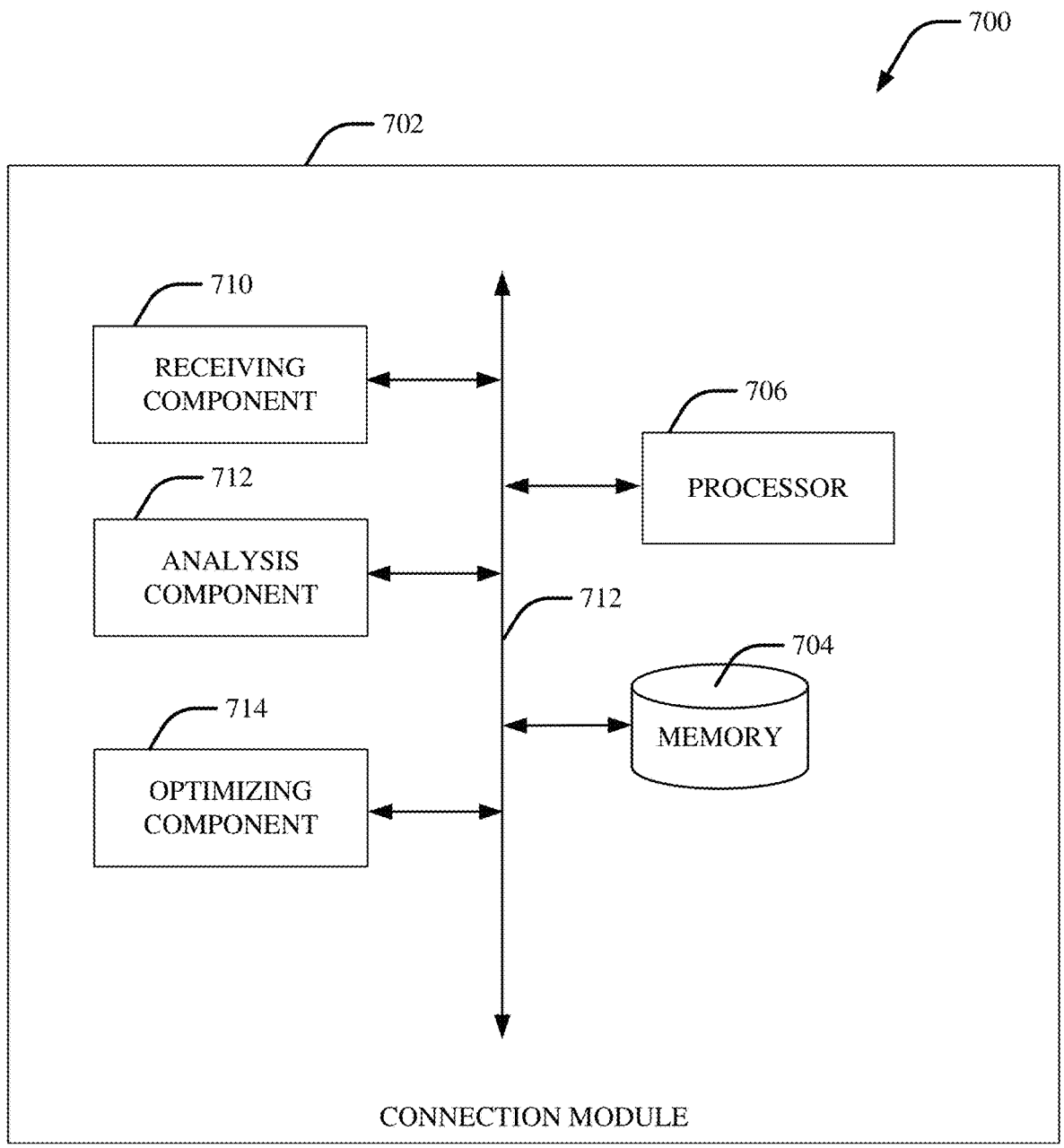
FIG. 7 illustrates a block diagram of an example, non-limiting system 700 that facilitates optimization of information required for establishing an initial connection with a network device in accordance with one or more embodiments described herein.

FIG. 7 illustrates a block diagram of an example, non-limiting system 700 that facilitates optimization of information required for establishing an initial connection with a network device in accordance with one or more embodiments described herein. According to some embodiments, the system 700 can comprise a connection module 702. In some embodiments, the connection module 702 can also include or otherwise be associated with a memory 704, a processor 706 that executes computer executable components stored in a memory 704. The connection module 702 can further include a system bus 708 that can couple various components including, but not limited to, a receiving component 710, an analysis component 712, and a optimizing component 714.

Aspects of systems (e.g., the connection module 702 and the like), apparatuses, or processes explained in this disclosure can constitute machine-executable component(s) embodied within machine(s), e.g., embodied in one or more computer readable mediums (or media) associated with one or more machines. Such component(s), when executed by the one or more machines, e.g., computer(s), computing device(s), virtual machine(s), etc. can cause the machine(s) to perform the operations described.

It should be appreciated that the embodiments of the subject disclosure depicted in various figures disclosed herein are for illustration only, and as such, the architecture of such embodiments are not limited to the systems, devices, and/or components depicted therein. For example, in some embodiments, the connection module 702 can comprise various computer and/or computing-based elements described herein with reference to operating environment 1100 and FIG. 11. In several embodiments, such computer and/or computing-based elements can be used in connection with implementing one or more of the systems, devices, and/or components shown and described in connection with FIG. 7 or other figures disclosed herein.

The memory 704 can store one or more computer and/or machine readable, writable, and/or executable components and/or instructions that, when executed by processor 706, can facilitate performance of operations defined by the executable component(s) and/or instruction(s). For example, the memory 704 can store computer and/or machine readable, writable, and/or executable components and/or instructions that, when executed by the processor 706, can facilitate execution of the various functions described herein relating to the receiving component 710, the analysis component 712, and the optimizing component 714.

In several embodiments, the memory 704 can comprise volatile memory (e.g., random access memory (RAM), static RAM (SRAM), dynamic RAM (DRAM), etc.) and/or non-volatile memory (e.g., read only memory (ROM), programmable ROM (PROM), electrically programmable ROM (EPROM), electrically erasable programmable ROM (EEPROM), etc.) that can employ one or more memory architectures. Further examples of memory 704 are described below with reference to system memory 1106 and FIG. 11. Such examples of memory 704 can be employed to implement any embodiments of the subject disclosure.

According to some embodiments, the processor 706 can comprise one or more types of processors and/or electronic circuitry that can implement one or more computer and/or machine readable, writable, and/or executable components and/or instructions that can be stored on the memory 704. For example, the processor 706 can perform various operations that can be specified by such computer and/or machine readable, writable, and/or executable components and/or instructions including, but not limited to, logic, control, input/output (I/O), arithmetic, and/or the like. In some embodiments, processor 706 can comprise one or more central processing unit, multi-core processor, microprocessor, dual microprocessors, microcontroller, System on a Chip (SOC), array processor, vector processor, and/or another type of processor.

In some embodiments, the processor 706, the memory 704, the receiving component 710, the analysis component 712, and the optimizing component 714 can be communicatively, electrically, and/or operatively coupled to one another via the system bus 708 to perform functions of the connection module 702, and/or any components coupled therewith. In several embodiments, the system bus 708 can comprise one or more memory bus, memory controller, peripheral bus, external bus, local bus, and/or another type of bus that can employ various bus architectures.

In several embodiments, the connection module 702 can comprise one or more computer and/or machine readable, writable, and/or executable components and/or instructions that, when executed by the processor 706, can facilitate performance of operations defined by such component(s) and/or instruction(s). Further, in numerous embodiments, any component associated with the connection module 702, as described herein with or without reference to the various figures of the subject disclosure, can comprise one or more computer and/or machine readable, writable, and/or executable components and/or instructions that, when executed by the processor 706, can facilitate performance of operations defined by such component(s) and/or instruction(s). For example, the receiving component 710, and/or any other components associated with the connection module 702 (e.g., communicatively, electronically, and/or operatively coupled with and/or employed by Connection module 702), can comprise such computer and/or machine readable, writable, and/or executable component(s) and/or instruction(s). Consequently, according to numerous embodiments, the connection module 702 and/or any components associated therewith, can employ the processor 706 to execute such computer and/or machine readable, writable, and/or executable component(s) and/or instruction(s) to facilitate performance of one or more operations described herein with reference to the connection module 702 and/or any such components associated therewith.

In some embodiments, the connection module 702 can facilitate performance of operations related to and/or executed by the components of connection module 702, for example, the processor 706, the memory 704, the receiving component 710, the analysis component 712, and the optimizing component 714. For example, as described in detail below, the connection module 702 can facilitate: receiving, (e.g., by the receiving component 710) a service request from a network device; determining (e.g., by the analysis component 712) a first size of a network device capabilities message, wherein the determining is based on a second size of the network device capability message previously collected from the network device; and based on a first result of analyzing the first size of the network device capabilities message and a message size threshold, determining (e.g., by the optimizing component 714) that the network device capabilities message is not greater than the message size threshold, and requesting the network device to provide the network device capabilities message associated with network device capabilities in accordance with a single step enquiry.

In some embodiments, the receiving component 710, can comprise one or more processors, memory, and electrical circuitry. The receiving component 710 receiving a service request from a network device. When a UE seeks to make a connection with the network node device, the UE transmits a service request. This request can be received at the network node device. The receive component 710 decodes the message and categorize initial the information about the UE, such as, UE identification, priority level and quality of service assigned to the UE or for this request.

In some embodiments, the analysis component 712, can comprise one or more processors, memory, and electrical circuitry. The analysis component 712, determining a first size of a network device capabilities message, wherein the determining is based on a second size of the network device capability message previously collected from the network device. According to some embodiments, the analysis component 712 evaluations information received from the UE to estimate the potential size of the UE capabilities message that the UE may transmit to establish connection. To provide the best user experience and service, the UE can provide various CA combinations to the network node device. Using these CA combinations, the network node device can provide the best throughput and increased functionalities. Given the RAT type available for UE (e.g., UE's capabilities based on RAT type available), the analysis component 712, can estimate the size of the message. In some embodiments, the analysis component 712 may evaluate information stored in memory 704 related to the UE currently requesting service. If the UE was previously connected to the network node device, the UE capabilities message size previously estimated is used for estimating current UE capabilities message size. The analysis component 712 may also evaluate data stored in memory 704 about other UEs that have similar characteristics as the requesting UE. Using information provided by the UE and knowledge of prior connections and/or capabilities similar to other UEs, the analysis component 712 is able to estimate the size of the UE capabilities message.

In some embodiments, the optimizing component 714, can comprise one or more processors, memory, and electrical circuitry. The optimizing component 714, based on a first result of analyzing the first size of the network device capabilities message and a message size threshold, determining that the network device capabilities message is not greater than the message size threshold, and requesting the network device to provide the network device capabilities message associated with network device capabilities in accordance with a single step enquiry. In some embodiments, the optimizing component 714 evaluates the results generated by the analysis component 712 against the maximum threshold (e.g., 8000 octets. The message size threshold is predefined by the operator and may be adjusted frequently to achieve high performance). If the estimated message size is not more than the message size threshold (e.g., the first result of analyzing), then the network node device requests the UE to use a single step or message to transmit the UE capabilities message to the network node device. Since the message would be less than the threshold, there is stronger likelihood that connection will be established between the UE and the network node device.

In some embodiments, if the estimated message size is more than the message size threshold (e.g., the second result of analyzing), then the network node device requests the UE to to transmit the UE capabilities message to the network node device using multi-step enquiry. In some embodiments, the multi-step enquiry comprises splitting a request of UE capabilities information into one or more enquiries. For example, a first enquiry comprises a request for various CA combinations associated with UTRA and E-UTRA RAT type, and a second enquiry comprises a request for various CA combinations associated with E-UTRA-NR and NR RAT type. For each enquiry, the UE generates a UE capabilities message, for example, first enquiry UE capabilities message for first enquiry (e.g., UTRA and E-UTRA) and a second enquiry UE capabilities message (e.g., E-UTRA-NR and NR). In some embodiments, the network node device further estimates message size for the first enquiry UE capabilities message and the second enquiry UE capabilities message.

In some embodiments, if the estimated messages size for the first enquiry UE capabilities message is below the message size threshold (e.g., <8000 octets), then the network node requests the UE to include a band report (e.g., information associated with available bands—first band and second band) for both local (e.g., first) and neighboring (e.g., second) bands. If the if the estimated messages size for the first enquiry UE capabilities message is above the message size threshold (e.g., >8000 octets), then the network node requests the UE to include a band report for local bands and trim the report until the message size threshold requirement is met.

In some embodiments, if the estimated messages size for the second enquiry UE capabilities message is below the message size threshold (e.g., <8000 octets), then the network node requests the UE to include a band report for both local and neighboring bands. If the if the estimated messages size for the first enquiry UE capabilities message is above the message size threshold (e.g., >8000 octets), then the network node requests the UE to include a band report for local bands and trim the report until the message size threshold requirement is met.

Figure 8:
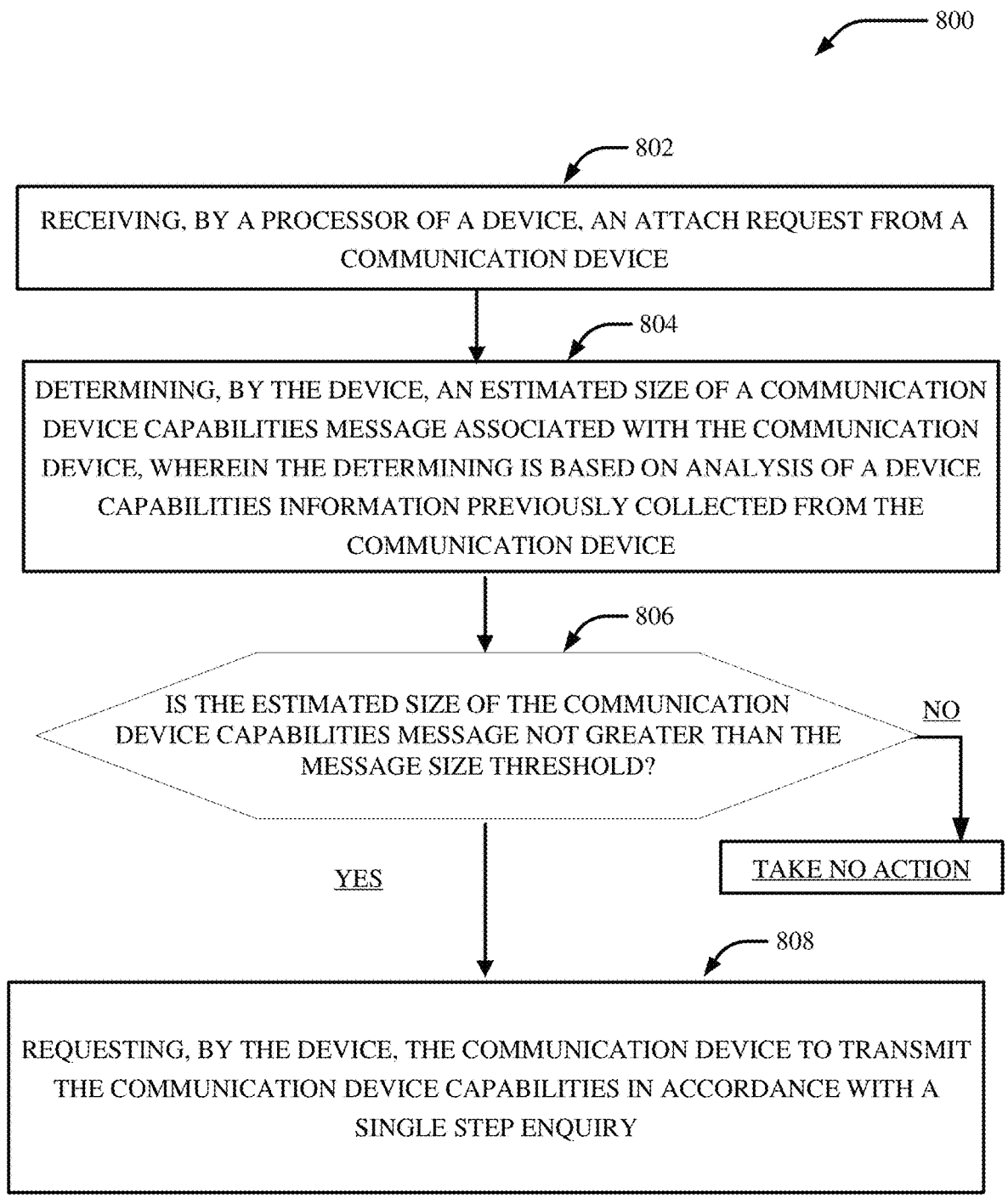
FIG. 8 depicts a diagram of an example, non-limiting computer implemented method that facilitates optimization of information required for establishing an initial connection with a network device in accordance with one or more embodiments described herein.

FIG. 8 depicts a diagram of an example, non-limiting computer implemented method that facilitates optimization of information required for establishing an initial connection with a network device in accordance with one or more embodiments described herein. In some examples, flow diagram 800 can be implemented by operating environment 1100 described below. It can be appreciated that the operations of flow diagram 800 can be implemented in a different order than is depicted.

In non-limiting example embodiments, a computing device (or system) (e.g., computer 1104) is provided, the device or system comprising one or more processors and one or more memories that stores executable instructions that, when executed by the one or more processors, can facilitate performance of the operations as described herein, including the non-limiting methods as illustrated in the flow diagrams of FIG. 8.

Operation 802 depicts receiving an attach request from a communication device. (e.g., for initial attachment/connection request, the UE transmits a service request to a gNB).

Operation 804 depicts determining an estimated size of a communication device capabilities message associated with the communication device, wherein the determining is based on analysis of a device capabilities information previously collected from the communication device (e.g., the gNB estimates the size of UE capabilities message based prior connection information and/or based on previous information provided with other UEs with similar capabilities). Operation 806 depicts determining if the estimated size of the communication device capabilities message is not greater than the message size threshold. If determined that the estimated size of the communication device capabilities message is not greater than the message size threshold, then perform operation 808. Otherwise, take no action and continue monitoring. Operation 808 depicts requesting, by the device, the communication device to transmit the communication device capabilities message associated with communication device capabilities in accordance with a single step enquiry (e.g., if determined that the estimated size of the UE capabilities message is below a threshold, then gNB can request the UE to transmit the UE capabilities message in one step rather than splitting the message).

Figure 9:
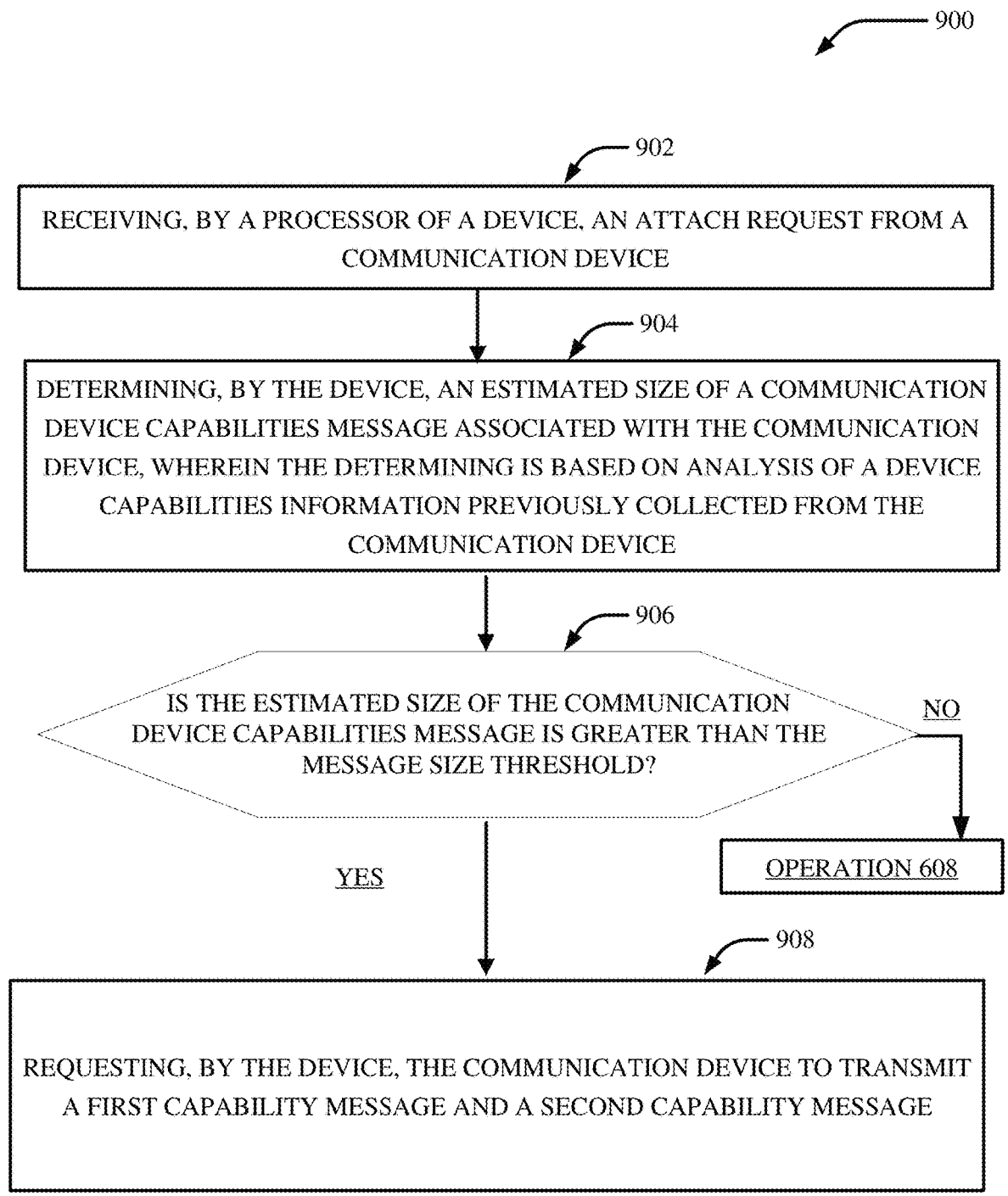
FIG. 9 depicts a diagram of an example, non-limiting computer implemented method that facilitates optimization of information required for establishing an initial connection with a network device in accordance with one or more embodiments described herein.

FIG. 9 depicts a diagram of an example, non-limiting computer implemented method that facilitates optimization of information required for establishing an initial connection with a network device in accordance with one or more embodiments described herein. In some examples, flow diagram 900 can be implemented by operating environment 1100 described below. It can be appreciated that the operations of flow diagram 900 can be implemented in a different order than is depicted.

In non-limiting example embodiments, a computing device (or system) (e.g., computer 1104) is provided, the device or system comprising one or more processors and one or more memories that stores executable instructions that, when executed by the one or more processors, can facilitate performance of the operations as described herein, including the non-limiting methods as illustrated in the flow diagrams of FIG. 9.

Operation 902 depicts receiving an attach request from a communication device. (e.g., for initial attachment/connection request, the UE transmits a service request to a gNB). Operation 904 depicts determining an estimated size of a communication device capabilities message associated with the communication device, wherein the determining is based on analysis of a device capabilities information previously collected from the communication device (e.g., the gNB estimates the size of UE capabilities message based prior connection information and/or based on previous information provided with other UEs with similar capabilities). Operation 906 depicts determining if the estimated size of the communication device capabilities message is greater than the message size threshold. If determined that the estimated size of the communication device capabilities message is greater than the message size threshold, then perform operation 908. Otherwise, perform operation 508 of FIG. 5. Operation 908 depicts requesting, by the device, the communication device to transmit a first capability message and a second capability message (e.g., if determined that the estimated size of the UE capabilities message is above a threshold, then gNB can request the UE to transmit the UE capabilities message in two steps). In some embodiments, the first message can comprise information related to legacy RAT type (e.g., EUTRA, UTRA or the like) and the second message can comprise newer RAT type (e.g., ETRRA-NR, NR, or the like).

Figure 10:
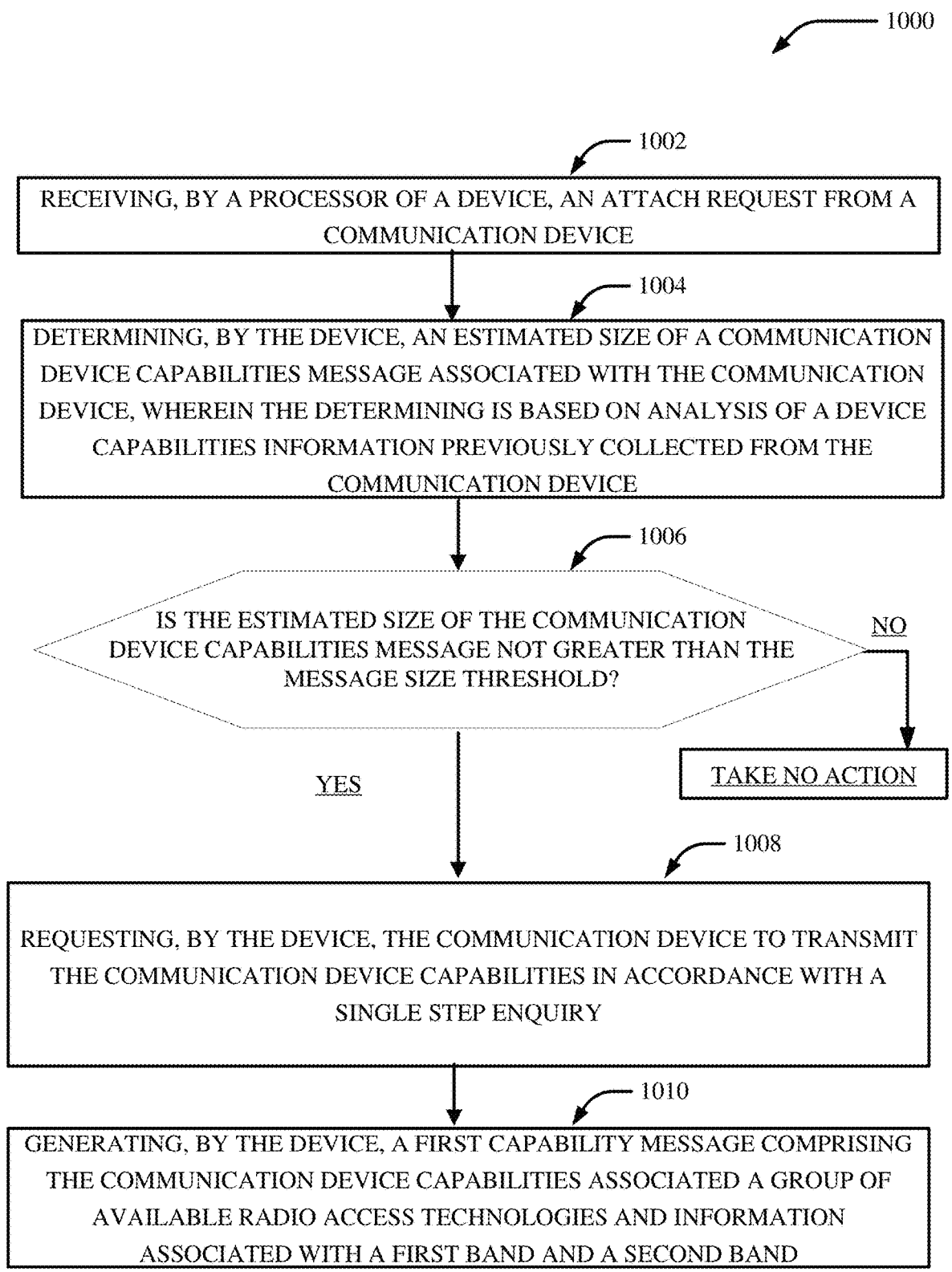
FIG. 10 depicts a diagram of an example, non-limiting computer implemented method that facilitates optimization of information required for establishing an initial connection with a network device in accordance with one or more embodiments described herein.

FIG. 10 depicts a diagram of an example, non-limiting computer implemented method that facilitates optimization of information required for establishing an initial connection with a network device in accordance with one or more embodiments described herein. In some examples, flow diagram 1000 can be implemented by operating environment 1100 described below. It can be appreciated that the operations of flow diagram 1000 can be implemented in a different order than is depicted.

In non-limiting example embodiments, a computing device (or system) (e.g., computer 1104) is provided, the device or system comprising one or more processors and one or more memories that stores executable instructions that, when executed by the one or more processors, can facilitate performance of the operations as described herein, including the non-limiting methods as illustrated in the flow diagrams of FIG. 10.

Operation 1002 depicts receiving an attach request from a communication device. (e.g., for initial attachment/connection request, the UE transmits a service request to a gNB). Operation 1004 depicts determining an estimated size of a communication device capabilities message associated with the communication device, wherein the determining is based on analysis of a device capabilities information previously collected from the communication device (e.g., the gNB estimates the size of UE capabilities message based prior connection information and/or based on previous information provided with other UEs with similar capabilities). Operation 1006 depicts determining if the estimated size of the communication device capabilities message is not greater than the message size threshold. If determined that the estimated size of the communication device capabilities message is not greater than the message size threshold, then perform operation 1008. Otherwise, take no action and continue monitoring. Operation 1008 depicts requesting, by the device, the communication device to transmit the communication device capabilities message associated with communication device capabilities in accordance with a single step enquiry (e.g., if determined that the estimated size of the UE capabilities message is below a threshold, then gNB can request the UE to transmit the UE capabilities message in one step rather than splitting the message). Operation 1010 depicts generating a first capability message comprising the communication device capabilities associated a group of available radio access technologies and information associated with a first band (e.g., local bands—B12, B30, B66, B2, n260) and a second band (e.g., neighbor site bands—B46 and B29). In some embodiments, when the estimated message size of the communication devices capabilities is below a threshold, transmit additional information such as the band information.

Figure 11:
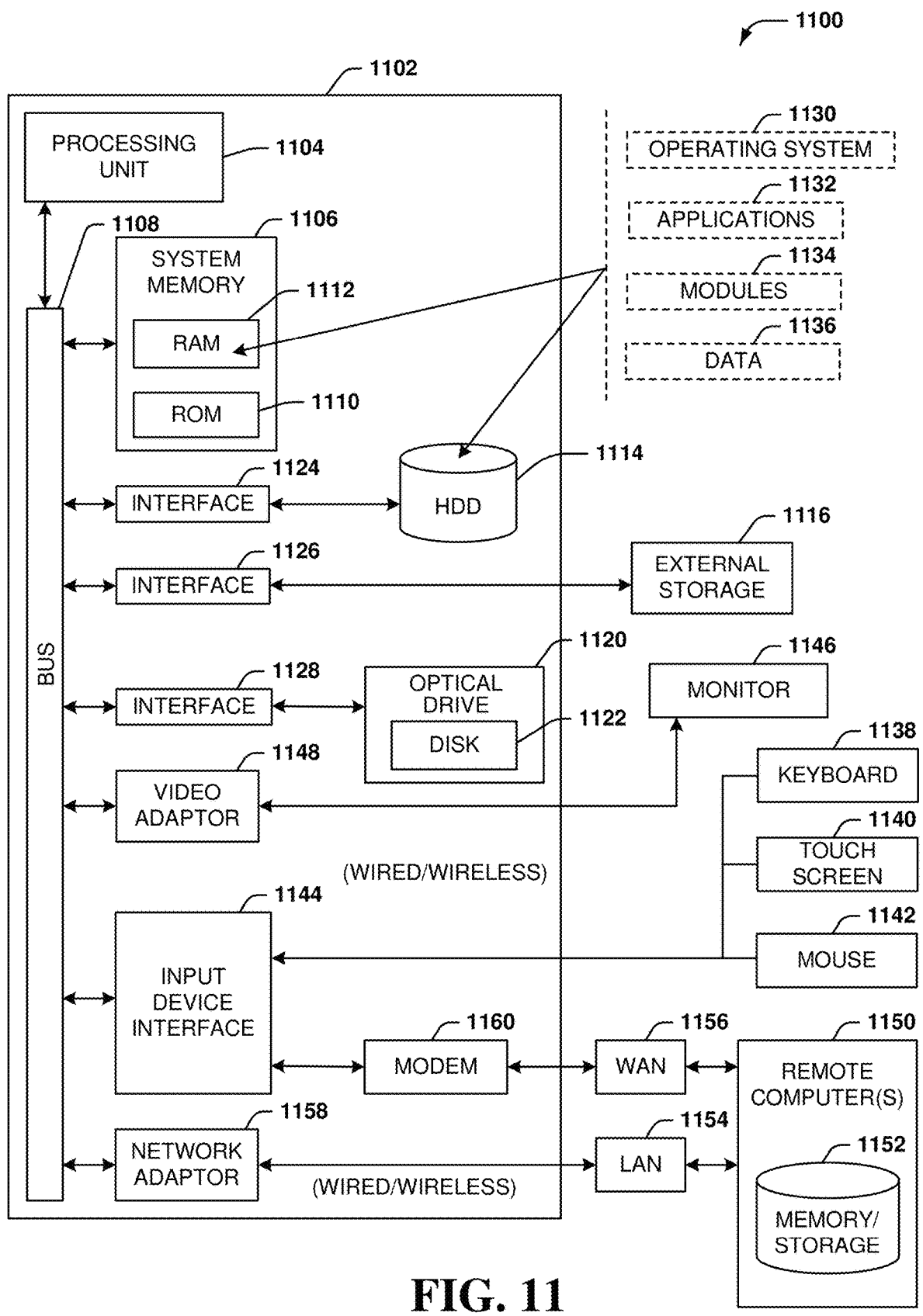
FIG. 11 illustrates an example block diagram of an example computer operable to engage in a system architecture that facilitates secure wireless communication according to one or more embodiments described herein.

Referring now to FIG. 11, illustrated is an example block diagram of an example computer 1100 operable to engage in a system architecture that facilitates wireless communications according to one or more embodiments described herein. The computer 1100 can provide networking and communication capabilities between a wired or wireless communication network and a server and/or communication device.

In order to provide additional context for various embodiments described herein, FIG. 11 and the following discussion are intended to provide a brief, general description of a suitable computing environment 1100 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 11, the example environment 1100 for implementing various embodiments of the aspects described herein includes a computer 1102, the computer 1102 including a processing unit 1104, a system memory 1106 and a system bus 1108. The system bus 1108 couples system components including, but not limited to, the system memory 1106 to the processing unit 1104. The processing unit 1104 can be any of various commercially available processors. Dual microprocessors and other multi-processor architectures can also be employed as the processing unit 1104.

The system bus 1108 can be any of several types of bus structure that can further interconnect to a memory bus (with or without a memory controller), a peripheral bus, and a local bus using any of a variety of commercially available bus architectures. The system memory 1106 includes ROM 1110 and RAM 1112. A basic input/output system (BIOS) can be stored in a non-volatile memory such as ROM, erasable programmable read only memory (EPROM), EEPROM, which BIOS contains the basic routines that help to transfer information between elements within the computer 1102, such as during startup. The RAM 1112 can also include a high-speed RAM such as static RAM for caching data.

The computer 1102 further includes an internal hard disk drive (HDD) 1114 (e.g., EIDE, SATA), one or more external storage devices 1116 (e.g., a magnetic floppy disk drive (FDD) 1116, a memory stick or flash drive reader, a memory card reader, etc.) and an optical disk drive 1120 (e.g., which can read or write from a CD-ROM disc, a DVD, a BD, etc.). While the internal HDD 1114 is illustrated as located within the computer 1102, the internal HDD 1114 can also be configured for external use in a suitable chassis (not shown). Additionally, while not shown in environment 1100, a solid state drive (SSD) could be used in addition to, or in place of, an HDD 1114. The HDD 1114, external storage device(s) 1116 and optical disk drive 1120 can be connected to the system bus 1108 by an HDD interface 1124, an external storage interface 1126 and an optical drive interface 1128, respectively. The interface 1124 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1102, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1112, including an operating system 1130, one or more application programs 1132, other program modules 1134 and program data 1136. All or portions of the operating system, applications, modules, and/or data can also be cached in the RAM 1112. The systems and methods described herein can be implemented utilizing various commercially available operating systems or combinations of operating systems.

Computer 1102 can optionally comprise emulation technologies. For example, a hypervisor (not shown) or other intermediary can emulate a hardware environment for operating system 1130, and the emulated hardware can optionally be different from the hardware illustrated in FIG. 11. In such an embodiment, operating system 1130 can comprise one virtual machine (VM) of multiple VMs hosted at computer 1102. Furthermore, operating system 1130 can provide runtime environments, such as the Java runtime environment or the .NET framework, for applications 1132. Runtime environments are consistent execution environments that allow applications 1132 to run on any operating system that includes the runtime environment. Similarly, operating system 1130 can support containers, and applications 1132 can be in the form of containers, which are lightweight, standalone, executable packages of software that include, e.g., code, runtime, system tools, system libraries and settings for an application.

Further, computer 1102 can be enable with a security module, such as a trusted processing module (TPM). For instance with a TPM, boot components hash next in time boot components, and wait for a match of results to secured values, before loading a next boot component. This process can take place at any layer in the code execution stack of computer 1102, e.g., applied at the application execution level or at the operating system (OS) kernel level, thereby enabling security at any level of code execution.

A user can enter commands and information into the computer 1102 through one or more wired/wireless input devices, e.g., a keyboard 1138, a touch screen 1140, and a pointing device, such as a mouse 1142. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1104 through an input device interface 1144 that can be coupled to the system bus 1108, but can be connected by other interfaces, such as a parallel port, an IEEE 1394 serial port, a game port, a USB port, an IR interface, a BLUETOOTH® interface, etc.

A monitor 1146 or other type of display device can be also connected to the system bus 1108 via an interface, such as a video adapter 1148. In addition to the monitor 1146, a computer typically includes other peripheral output devices (not shown), such as speakers, printers, etc.

The computer 1102 can operate in a networked environment using logical connections via wired and/or wireless communications to one or more remote computers, such as a remote computer(s) 1150. The remote computer(s) 1150 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1152 is illustrated. The logical connections depicted include wired/wireless connectivity to a local area network (LAN) 1154 and/or larger networks, e.g., a wide area network (WAN) 1156. Such LAN and WAN networking environments are commonplace in offices and companies, and facilitate enterprise-wide computer networks, such as intranets, all of which can connect to a global communications network, e.g., the Internet.

When used in a LAN networking environment, the computer 1102 can be connected to the local network 1154 through a wired and/or wireless communication network interface or adapter 1158. The adapter 1158 can facilitate wired or wireless communication to the LAN 1154, which can also include a wireless access point (AP) disposed thereon for communicating with the adapter 1158 in a wireless mode.

When used in a WAN networking environment, the computer 1102 can include a modem 1160 or can be connected to a communications server on the WAN 1156 via other means for establishing communications over the WAN 1156, such as by way of the Internet. The modem 1160, which can be internal or external and a wired or wireless device, can be connected to the system bus 1108 via the input device interface 1144. In a networked environment, program modules depicted relative to the computer 1102 or portions thereof, can be stored in the remote memory/storage device 1152. It will be appreciated that the network connections shown are example and other means of establishing a communications link between the computers can be used.

When used in either a LAN or WAN networking environment, the computer 1102 can access cloud storage systems or other network-based storage systems in addition to, or in place of, external storage devices 1116 as described above. Generally, a connection between the computer 1102 and a cloud storage system can be established over a LAN 1154 or WAN 1156 e.g., by the adapter 1158 or modem 1160, respectively. Upon connecting the computer 1102 to an associated cloud storage system, the external storage interface 1126 can, with the aid of the adapter 1158 and/or modem 1160, manage storage provided by the cloud storage system as it would other types of external storage. For instance, the external storage interface 1126 can be configured to provide access to cloud storage sources as if those sources were physically connected to the computer 1102.

The computer 1102 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media, device readable storage devices, or machine readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Moreover, terms like "user equipment (UE)," "mobile station," "mobile," subscriber station," "subscriber equipment," "access terminal," "terminal," "handset," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point (AP)," "base station," "NodeB," "evolved Node B (eNodeB)," "home Node B (HNB)," "home access point (HAP)," "cell device," "sector," "cell," "relay device," "node," "point," and the like, are utilized interchangeably in the subject application, and refer to a wireless network component or appliance that serves and receives data, control, voice, video, sound, gaming, or substantially any data-stream or signaling-stream to and from a set of subscriber stations or provider enabled devices. Data and signaling streams can include packetized or frame-based flows.

Additionally, the terms "core-network", "core", "core carrier network", "carrier-side", or similar terms can refer to components of a telecommunications network that typically provides some or all of aggregation, authentication, call control and switching, charging, service invocation, or gateways. Aggregation can refer to the highest level of aggregation in a service provider network wherein the next level in the hierarchy under the core nodes is the distribution networks and then the edge networks. UEs do not normally connect directly to the core networks of a large service provider but can be routed to the core by way of a switch or radio area network. Authentication can refer to determinations regarding whether the user requesting a service from the telecom network is authorized to do so within this network or not. Call control and switching can refer determinations related to the future course of a call stream across carrier equipment based on the call signal processing. Charging can be related to the collation and processing of charging data generated by various network nodes. Two common types of charging mechanisms found in present day networks can be prepaid charging and postpaid charging. Service invocation can occur based on some explicit action (e.g. call transfer) or implicitly (e.g., call waiting). It is to be noted that service "execution" may or may not be a core network functionality as third party network/nodes may take part in actual service execution. A gateway can be present in the core network to access other networks. Gateway functionality can be dependent on the type of the interface with another network.

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks include Geocast technology; broadcast technologies (e.g., sub-Hz, ELF, VLF, LF, MF, HF, VHF, UHF, SHF, THz broadcasts, etc.); Ethernet; X.25; powerline-type networking (e.g., PowerLine AV Ethernet, etc.); femto-cell technology; Wi-Fi; Worldwide Interoperability for Microwave Access (WiMAX); Enhanced General Packet Radio Service (Enhanced GPRS); Third Generation Partnership Project (3GPP or 3G) Long Term Evolution (LTE); 3GPP Universal Mobile Telecommunications System (UMTS) or 3GPP UMTS; Third Generation Partnership Project 2 (3GPP2) Ultra Mobile Broadband (UMB); High Speed Packet Access (HSPA); High Speed Downlink Packet Access (HSDPA); High Speed Uplink Packet Access (HSUPA); GSM Enhanced Data Rates for GSM Evolution (EDGE) Radio Access Network (RAN) or GERAN; UMTS Terrestrial Radio Access Network (UTRAN); or LTE Advanced.

What has been described above includes examples of systems and methods illustrative of the disclosed subject matter. It is, of course, not possible to describe every combination of components or methods herein. One of ordinary skill in the art may recognize that many further combinations and permutations of the disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

While the various embodiments are susceptible to various modifications and alternative constructions, certain illustrated implementations thereof are shown in the drawings and have been described above in detail. It should be understood, however, that there is no intention to limit the various embodiments to the specific forms disclosed, but on the contrary, the intention is to cover all modifications, alternative constructions, and equivalents falling within the spirit and scope of the various embodiments.

In addition to the various implementations described herein, it is to be understood that other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be effected across a plurality of devices. Accordingly, the embodiments are not to be limited to any single implementation, but rather are to be construed in breadth, spirit and scope in accordance with the appended claims.

What is claimed is:

1. Network equipment, comprising:
a processor; and
a memory that stores executable instructions that, when executed by the processor, facilitate performance of operations, comprising:
receiving a service request from a user equipment;
determining a first size of a user equipment capabilities message, wherein the determining is based on a second size, of the user equipment capabilities message, previously collected from the user equipment; and
requesting the user equipment to provide the user equipment capabilities message, wherein the requesting comprises:
in response to determining that the first size of the user equipment capabilities message is not greater than a message size threshold, requesting the user equipment to provide the user equipment capabilities message in accordance with a single step enquiry; and
in response to determining that the first size of the user equipment capabilities message is greater than the message size threshold, requesting the user equipment to provide the user equipment capabilities message in accordance with a multiple step enquiry comprising:
generating a first capability message comprising a first group of user equipment capabilities associated with a first group of radio access technologies, and
generating a second capability message comprising a second group of user equipment capabilities associated with a second group of radio access technologies.

2. The network equipment of claim 1, wherein the first capability message further comprises first information associated with a first band.

3. The network equipment of claim 2, wherein the second capability message further comprises second information associated with a second band.

4. The network equipment of claim 1, wherein the single step enquiry comprises generating the user equipment capabilities message representative of a third group of user equipment capabilities associated with a third group of radio access technologies and information associated with a first band and a second band.

5. A method, comprising:
receiving, by a device comprising a processor, an attach request from a communication device;
determining, by the device, an estimated size of a communication device capabilities message associated with the communication device, wherein the determining is based on analysis of device capabilities information previously collected from the communication device; and
requesting, by the device, the communication device to transmit the communication device capabilities message, wherein the requesting comprises:
in response to determining that the estimated size of the communication device capabilities message is less than a message size threshold, requesting the communication device to provide the communication device capabilities message in accordance with a single step enquiry, and
in response to determining that the estimated size of the communication device capabilities message is not less than the message size threshold, requesting the communication device to provide the communication device capabilities message in accordance with a multiple step enquiry comprising:

generating a first capability message comprising a first group of communication device capabilities associated with a first group of radio access technologies, and generating a second capability message comprising a second group of communication device capabilities associated with a second group of radio access technologies.

6. The method of claim 5, wherein the first capability message further comprises first information associated with a first band, and wherein the second capability message further comprises second information associated with a second band.

7. The method of claim 5, wherein the second capability message further comprises a band report comprising information associated with a first band and a second band.

8. The method of claim 5, wherein the single step enquiry comprises generating the communication device capabilities message comprising a third group of communication device capabilities associated with a third group of radio access technologies and information associated with a first band and a second band.

9. A non-transitory machine-readable medium, comprising executable instructions that, when executed by a processor, facilitate performance of operations, comprising:

receiving an attach request from a first network device;

determining an estimated size of a network device capabilities message associated with the first network device, wherein the determining is based on a device capabilities information previously collected from the first network device and a second network device; and requesting the first network device to transmit the network device capabilities message, wherein the requesting comprises:

in response to determining that the estimated size of the network device capabilities message is smaller than a threshold message size, requesting the first network device to provide the network device capabilities message in accordance with a single step enquiry, and in response to determining that the estimated size of the network device capabilities message is at least the threshold message size, requesting the first network device to provide the network device capabilities message in accordance with a multiple step enquiry comprising:

generating a first capability message comprising a first group of first network device capabilities associated with a first group of radio access technologies, and generating a second capability message comprising a second group of first network device capabilities associated with a second group of radio access technologies.

10. The non-transitory machine-readable medium of claim 9, wherein the first capability message further comprises first information associated with a first band.

11. The non-transitory machine-readable medium of claim 10, wherein the second capability message further comprises second information associated with a second band.

12. The non-transitory machine-readable medium of claim 9, wherein the single step enquiry comprises generating the network device capabilities message comprising a third group of first network device capabilities associated with a third group of available radio access technologies and information associated with a first band and a second band.

13. The non-transitory machine-readable medium of claim 9, wherein the threshold message size is predefined.

14. The non-transitory machine-readable medium of claim 9, wherein the threshold message size is adjustable to satisfy a defined network performance.

15. The network equipment of claim 1, wherein the message size threshold is predefined.

16. The network equipment of claim 1, wherein the message size threshold is adjustably defined based on input corresponding to a defined network performance requirement.

17. The network equipment of claim 1, wherein the user equipment is a vehicle.

18. The network equipment of claim 1, wherein the user equipment is a mobile device.

19. The method of claim 5, wherein the message size threshold is defined prior to requesting the communication device to transmit the communication device capabilities message.

20. The method of claim 5, further comprising:

based on a value representing a network performance level, changing, by the device, the message size threshold to an updated message size threshold corresponding to the network performance level.

* * * * *